Figure 15:
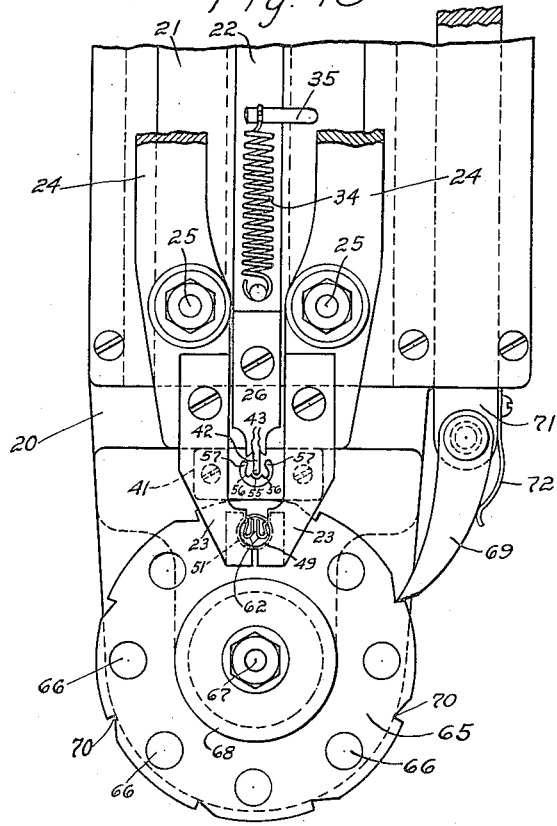

A. J. LEWIS.
METHOD OF FORMING AND ASSEMBLING SNAP FASTENER SPRINGS.
APPLICATION FILED JUNE 17, 1918.
1,305,132.
Patented May 27, 1919.
3 SHEETS—SHEET 1.
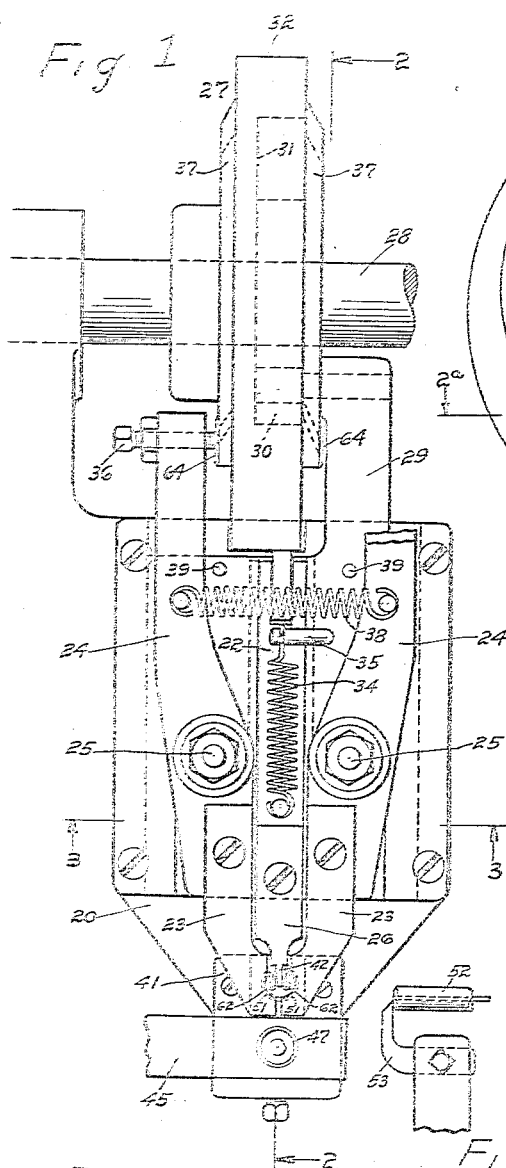
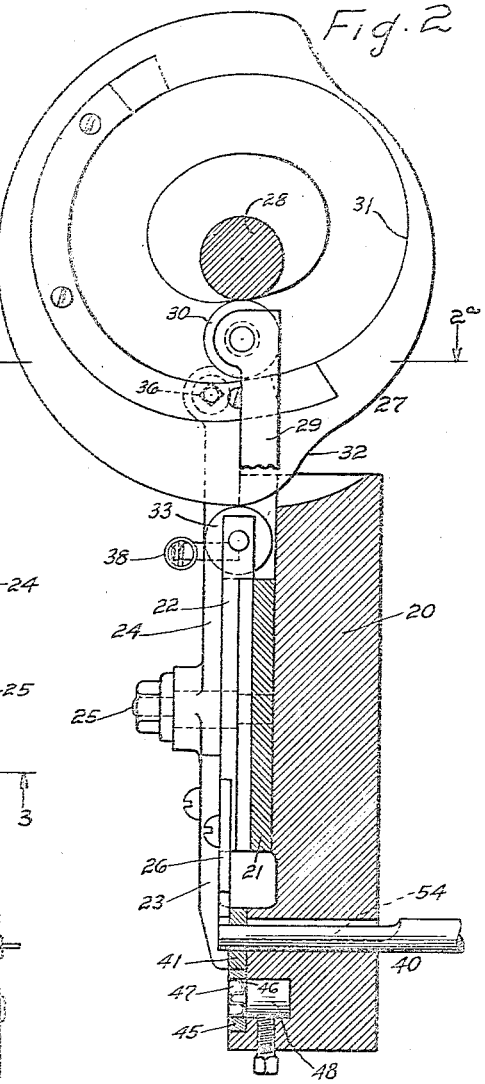
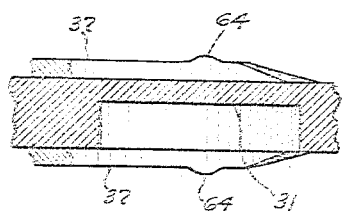
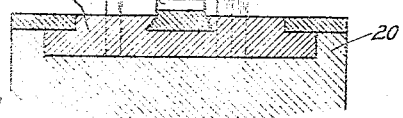
INVENTOR
Arthur J. Lewis
BY
A. M. Wooster
ATTORNEY A. J. LEWIS.
METHOD OF FORMING AND ASSEMBLING SNAP FASTENER SPRINGS.
APPLICATION FILED JUNE 17, 1918.
1,305,132.
Patented May 27, 1919.
3 SHEETS—SHEET 2.
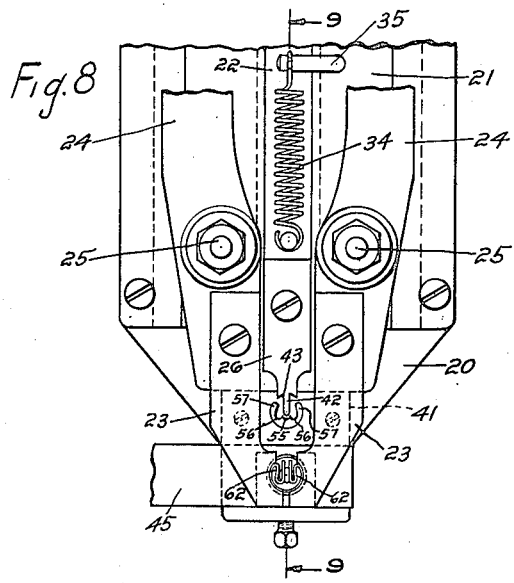
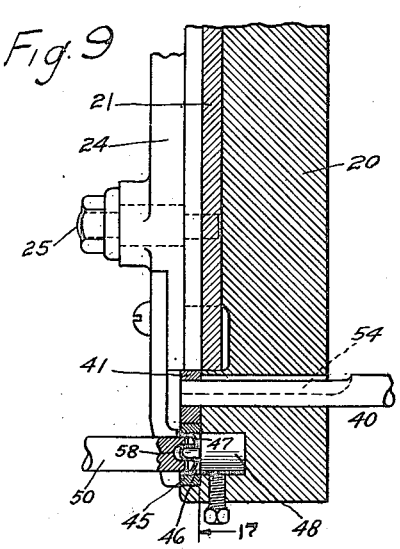
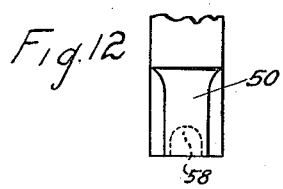
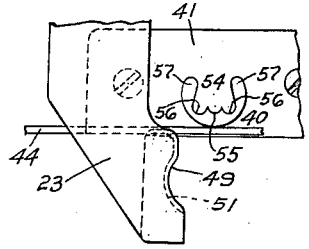
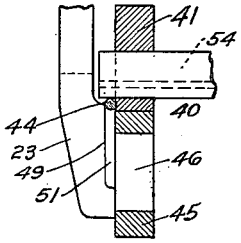
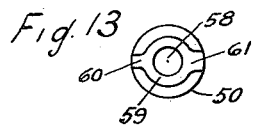
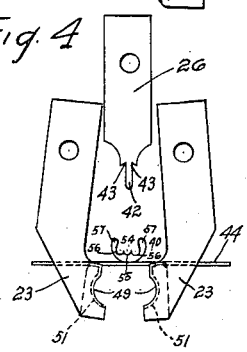
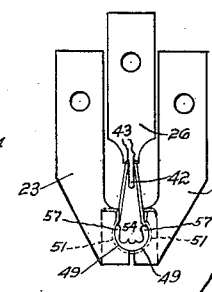
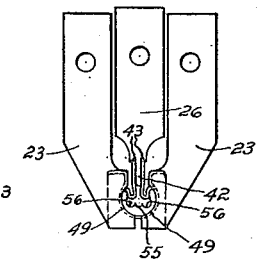
INVENTOR
Arthur J. Lewis
BY
A. M. Wooster
ATTORNEY A. J. LEWIS.
METHOD OF FORMING AND ASSEMBLING SNAP FASTENER SPRINGS.
APPLICATION FILED JUNE 17, 1918.

Patented May 27, 1919.
3 SHEETS—SHEET 3.

INVENTOR
Arthur J. Lewis
BY
A. M. Wooster
ATTORNEY

UNITED STATES PATENT OFFICE.

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT.

METHOD OF FORMING AND ASSEMBLING SNAP-FASTENER SPRINGS.

1,305,132.  Specification of Letters Patent.  Patented May 27, 1919.

Original application filed August 5, 1916, Serial No. 113,358. Divided and this application filed June 17, 1918. Serial No. 240,293.

*To all whom it may concern:*

Be it known that I, ARTHUR J. LEWIS, a citizen of the United States, residing at Stratford, county of Fairfield, State of Connecticut, have invented an Improvement in Methods of Forming and Assembling Snap-Fastener Springs, of which the following is a specification.

The invention relates to the manufacture of the socket members of snap fasteners, so called, the socket members of which are provided with wire springs of peculiar formation which lock the shanks of the other fastener members in engagement with the socket members, and the present application is a division of my pending application for patent for mechanism for forming and assembling snap fastener springs, Serial No. 113,358, filed Aug. 5, 1916.

Figure 16:
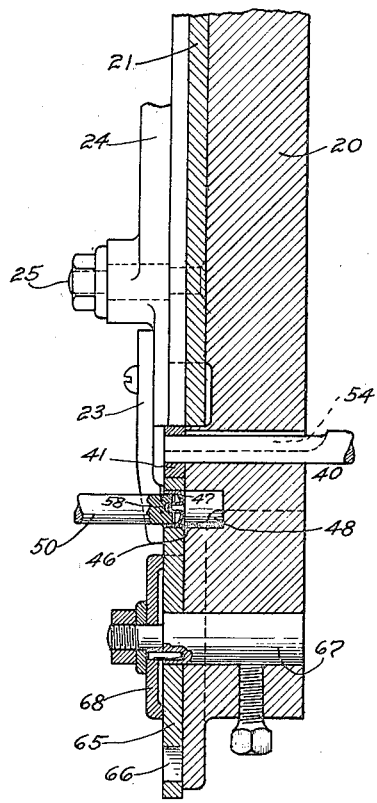

In the accompanying drawings forming a part of this specification,

Figure 1 is a plan view of a preferred form of mechanism for carrying out my improved method, partly broken away, showing the position of the parts at the end of the spring forming operation and before the assembling operation;

Fig. 2 a section on the line 2—2 in Fig. 1, looking in the direction of the arrows;

Fig. 2ᵃ a detail sectional view on the line 2ᵃ—2ᵃ in Fig. 2, showing the side cams as provided with bumps to produce a spring setting movement of the jaws;

Fig. 3 a section on the line 3—3 in Fig. 1, looking in the direction of the arrows;

Fig. 4 a detail plan view showing the jaws, forming punch and form in their normal position and a blank of wire in position to be operated upon;

Fig. 5 a similar view showing the position of the parts when the jaws have completed their portion of the forming operation;

Fig. 6 a similar view, the punch having partly completed the formation of a spring;

Fig. 7 a view of the spring as formed by the coöperation of the jaws, forming punch and form;

Fig. 8 a partial plan view showing the position of the parts after the form has been retracted and the jaws have carried the completed spring to the assembling position;

Fig. 9 a section on the line 9—9 in Fig. 8, looking in the direction of the arrows, and also showing the assembling punch, which is partly broken away, in the act of assembling a spring in the socket member of a snap fastener;

Fig. 10 a detail plan view and Fig. 11 a detail sectional view on an enlarged scale showing the position of the wire spring blank relatively to one jaw and the form, when the forming operation commences;

Fig. 12 an elevation and Fig. 13 an inverted plan view of the assembling punch;

Fig. 14 an end view of the form;

Fig. 15 a view corresponding with Fig. 8, showing the substitution of a rotary holder for a reciprocating holder;

Fig. 16 a central sectional view corresponding therewith, and

Figure 17:
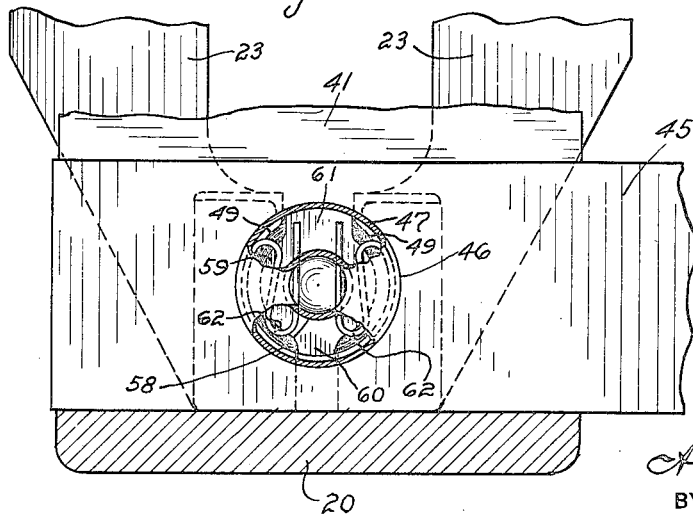

Fig. 17 is an enlarged detail sectional view on the line 17 in Fig. 9, looking in the direction of the arrow.

20 denotes the bed, 21 a slide adapted to reciprocate longitudinally in ways in the bed, 22 a slide adapted to reciprocate longitudinally in ways in slide 21 and independently thereof, 23 jaws carried by levers 24 pivoted to slide 21, as at 25, and 26 the forming punch which is carried by slide 22. The jaw levers and both slides are operated by means of a cam member 27 carried by a driving shaft 28 journaled in the bed. Slide 21 is provided with a rearwardly extending arm 29 carrying a roller 30 which engages a groove 31 in the cam member, whereby reciprocatory movement is imparted to said slide. Slide 22 is reciprocated by means of an edge cam 32 on the cam member, which is engaged by a roller 33 at the rear end of the slide. A spring 34 connected to slide 22 and to a pin 35 extending from slide 21 acts to retain the roller continuously in engagement with the cam and cause retraction of slide 22 with relation to the slide 21. The rear ends of the jaw levers are provided with adjusting screws 36 which engage side cams 37 on opposite sides of the cam member. These cams act to force the rear ends of the jaw levers outward and thus close the jaws, which are opened by a spring 38 connected to the jaw levers back of their pivotal point and acting to draw the rear ends of said levers toward each other and thus open the jaws when the adjusting screws ride down the inclines of the side cams. Stop pins 39 in slide 21 limit the inward movement of the jaw levers and consequently the opening movement of the jaws. 40 denotes the form for springs which is adapted to be reciprocated vertically in the bed by suitable operating mechanism, not shown, as specifically it forms no portion of the present invention. The forward end of the form passes through a hardened plate 41 secured to the bed. The operative portion of the forming punch comprises a tongue 42 and notches 43 on opposite sides thereof which receive the ends of the wire spring blank 44, as will be more fully explained. 45 denotes a holder which is provided with a socket 46 to receive the articles in which the springs are to be assembled, and which I term spring receiving articles, (in the present instance the fastener members 47) and carries them to the spring receiving or assembling position, as will be more fully explained.

In the form illustrated in Figs. 1, 2, 8 and 9, the holder is a slide adapted to reciprocate in a way in the bed. In Figs. 15 and 16, I have illustrated a form in which a rotary holder is used in lieu of a reciprocating holder. 65 denotes a disk provided with sockets 66, to receive the articles and mounted to rotate on a stud 67, and 68 denotes a friction washer bearing upon the face of the disk. The disk is provided in its edge with notches 70, adapted to be engaged by a pawl 69, controlled by a spring 72. The pawl is pivoted to a slide 71, which is adapted to reciprocate in a way in the bed.

A hardened plug 48, seated in the bed, forms a base for the socket in the assembling position. The operative portions of the jaws are provided with half sockets 49 which together form a socket which receives the form in the spring forming operation and through which the assembling punch 50 passes in the assembling operation, as will be more fully explained. In the backs of the jaws and surrounding the half sockets and extending across the tops of the operative portions of the jaws are grooves 51 adapted to receive the wire spring blank. The assembling punch has reciprocatory movement imparted to it in a path perpendicular to the bed by suitable operating mechanism. This operating mechanism and the wire feeding mechanism are not shown as specifically they form no portion of the present invention, it being deemed sufficient for the purposes of this specification to state that the wire may be fed to the machine in any ordinary or preferred manner and that the assembling punch may be operated by any suitable mechanism. The wire is fed to the machine through a quill 52, each operation of the feeding mechanism supplying just the required length of wire to form a spring blank. The instant the feeding operation ceases, a cutter 53 coöperating with the forward end of the quill cuts off the blank. Any ordinary or preferred form of feeding and cutting-off mechanism may be used. The shape of the form will be clearly understood from Fig. 14, which is an end elevation. The external contour is circular. Within this circular contour the metal is milled out to form a longitudinal recess indicated by 54. At the base of the recess is a central rounded longitudinal groove indicated by 55, which is adapted to receive the tongue of the forming punch, and on opposite sides of groove 55 are rounded longitudinal grooves 56 into which the wire of the spring blank is pressed by the forming punch, as will be more fully explained. The sides of the form comprise upwardly extending arms 57 which are rounded at their upper ends (about which the wire of the blank is curved) and which incline inward toward each other, the lower portion of recess 54 being wider than the upper portion. The hole in plate 41 through which the form passes corresponds substantially in configuration with the configuration of the form.

The shape of the assembling punch will be clearly understood from Figs. 12 and 13, the essential requirement being that the end of the punch be so shaped as to remove the formed springs from the jaws and deposit them in the fastener members. I have shown the face of the assembling punch as provided with a hole 58 surrounded by a rib 59 from which wings 60 and 61, in alinement, extend to the edge of the face. Hole 58 is provided to receive the tip of the central stud of a fastener member. The rib and wings comprise the bearing portions of the assembling punch. The rib bears on the loops of the spring, and the wings pass between the jaws, rib 59 engaging the central portion of the spring, wing 60 engaging the periphery of the spring and wing 61 engaging the ends of the spring. The article holder, shown only in the assembling position, reciprocates in its way transversely to slides 21 and 22. From the position shown in Figs. 1, 2, 8 and 9, the holder moves toward the left to the receiving position where the spring receiving articles are placed in the socket by suitable feeding mechanism. From the receiving position the article holder moves to the assembling position and after the assembling operation, presently to be described, returns again to the receiving position where the article with a spring assembled therein is ejected, and a new article is placed in the socket by the article feeding mechanism as before. Neither the operating mechanism for the assembling slide, the article feeding mechanism, nor the ejecting mechanism is shown, as specifically these mechanisms form no portion of the present invention.

Starting with the jaws and forming punch in the position shown in Fig. 4, a feeding operation takes place and leaves a blank of wire in position to be operated upon, as in Figs. 4, 10 and 11, the blank lying under the form and in the socket formed by coöperation of the jaws, form and plate 41. Next follows a retraction of slide 21 which causes the jaws to move backward from the position shown in Fig. 4 toward that in Fig. 5, and bend the blank over the form. The movement of the slide is followed by a closing movement of the jaws, which clasps the blank about the form and over the ends of arms 57, the blank now lying in the socket formed by half sockets 49, with the ends of the blank extending outward and lying on opposite sides of the tongue of the forming punch and in notches 43. Next follows a forward movement of slide 22 and the forming punch. The ends of the blank will now be pushed forward by the forming punch, as shown in Fig. 6, the arms of the blank being bent over arms 57 and folded into recess 54, the movement continuing until the forming punch reaches the position shown in Fig. 1. Loops 62 of the completed spring, indicated by 63, will now lie in grooves 56 in the form and the tongue of the forming punch will be received in groove 55 in the form, the ends of the spring lying parallel with each other on opposite sides of the tongue, as clearly shown in Fig. 1. The form now moves backward to the position shown in Fig. 9, the tongue, jaws and spring remaining as in Fig. 1. While the parts are in this position and before the assembling operation, I may or may not, depending upon conditions, impart a closing movement to the jaws, the effect of which is to set the spring to the shape in which it has been formed while the ends of the spring are still separated by the tongue. This setting movement of the jaws is effected by providing side cams 37 with bumps 64 (see Fig. 2ª), the function of which is to cause a quick setting movement or squeeze of the jaws, after which they return to the position shown in Fig. 1. Slide 21 and the jaws now move from the position shown in Fig. 1 to that shown in Fig. 8, carrying the completed spring to the assembling position. An instant later slide 22 and the forming punch will move backward from the position shown in Fig. 1 to the position shown in Fig. 4. Holder 45 with a spring receiving article in the socket will now be in the assembling position and the assembling punch, which is suitably shaped for the purpose, will move forward and pass into the socket formed by half sockets 49 in the jaws and engage the spring, which is carried forward out of the jaws by the assembling punch and is seated in the spring receiving article lying in the socket in the holder. The assembling punch now moves backward to its normal position and the jaws first open outward and then return to their normal position, as in Fig. 4. The holder now moves to the receiving position and the fastener member or other article with a spring assembled therein is ejected from the socket in the holder and another fastener member or other article is placed therein. By this time a new wire spring blank will have been fed into position to be operated upon and the jaws and forming punch will now commence the formation of another spring, these operations being continuously repeated.

Having thus described my invention, I claim:

1. The method of forming springs which consists in bending a blank of wire over a recessed form and retaining it there with the ends extending outward and then pushing the ends of the blank inward and causing the arms of the blank to fold into the recess in the form.

2. The method of forming springs which consists in bending a blank of wire about a recessed form and then pushing on the ends of the blank to cause the arms of the blank to fold into the recess in the form.

3. The method of forming springs which consists in bending a blank of wire about a recessed form, then pushing on the ends of the blank and causing the arms of the blank to fold into the recess in the form, then withdrawing the form, and then compressing the spring to set it.

4. The method of forming and assembling springs which consists in bending a blank of wire about a recessed form, then pushing upon the ends of the blank to cause the arms of the blank to fold into the recess in the form, then withdrawing the form, and then pushing the spring directly from the jaws into the article that is to receive it.

5. The method of forming and assembling springs which consists in bending a blank of wire about a recessed form, then pushing upon the ends of the blank to cause the arms of the blank to fold into the recess in the form, then withdrawing the form, then compressing the spring to set it, and then pushing the spring directly from the jaws into the article that is to receive it.

6. The method of forming springs which consists in partly forming the spring by bending a blank of wire about a form, leaving the ends extending outward, and then pushing the ends of the blank inward.

7. The method of forming and assembling springs which consists in bending the midlength of a blank of wire about a recessed form, retaining the blank in place, then pushing against the ends of the blank to cause the ends of the blank to fold into the recess in the form, then withdrawing the form, and then pushing the completed spring into the article that is to receive it.

8. The method of forming and assembling springs which consists in bending the midlength of a blank of wire about a recessed form, pushing against the ends of the blank to complete the formation of the spring while it is held in engagement with the form, then withdrawing the form, and then pushing the spring into the article that is to receive it.

9. The method of forming and assembling springs which consists in bending the midlength of a blank of wire about a recessed form, pushing against the ends of the blank to complete the formation of the spring while it is held in engagement with the form, then withdrawing the form, then compressing the spring to set it, and then pushing the spring into the article that is to receive it.

In testimony whereof I affix my signature.

ARTHUR J. LEWIS.